July 4, 1950     S. C. HETH     2,513,480
MOBILE CROP DRIER

Filed Feb. 10, 1947     3 Sheets-Sheet 1

Inventor
Sherman C. Heth
By
Attorney

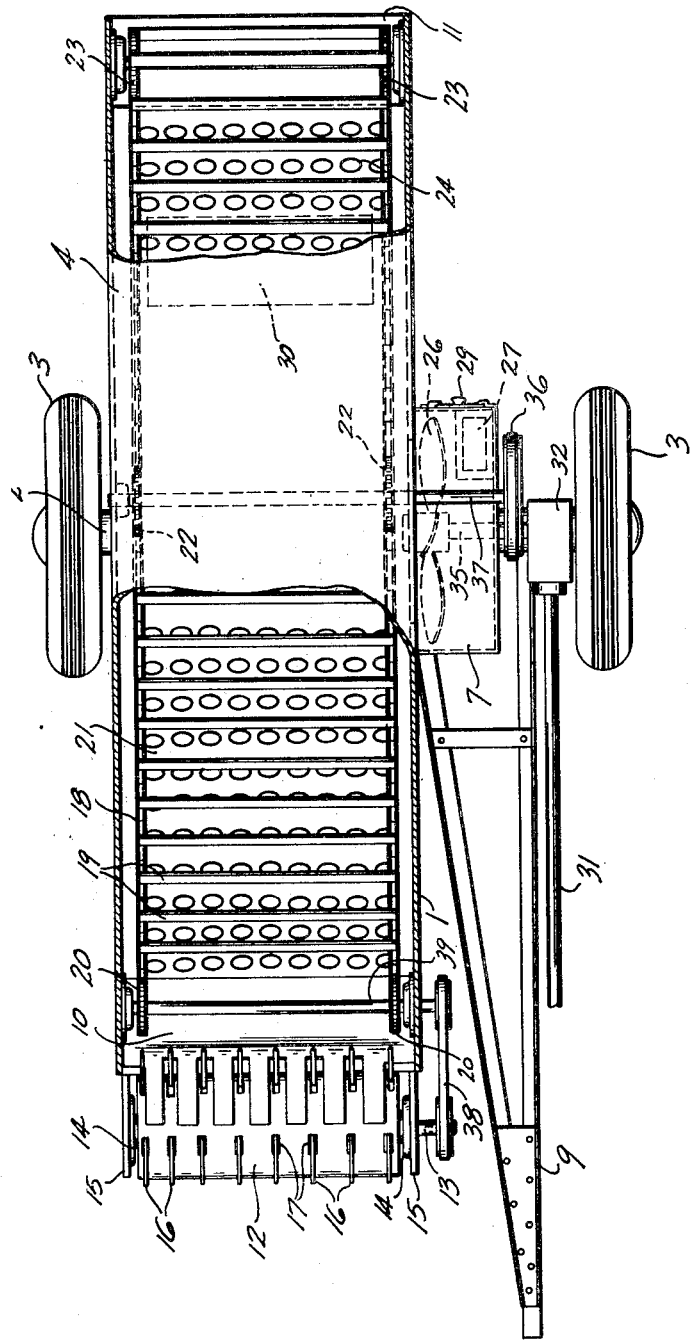

July 4, 1950 S. C. HETH 2,513,480
MOBILE CROP DRIER
Filed Feb. 10, 1947 3 Sheets-Sheet 3
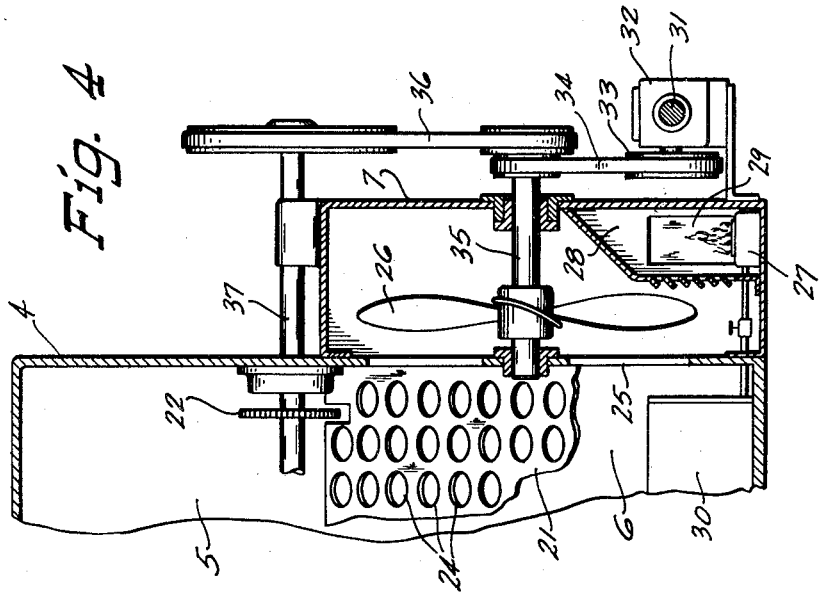
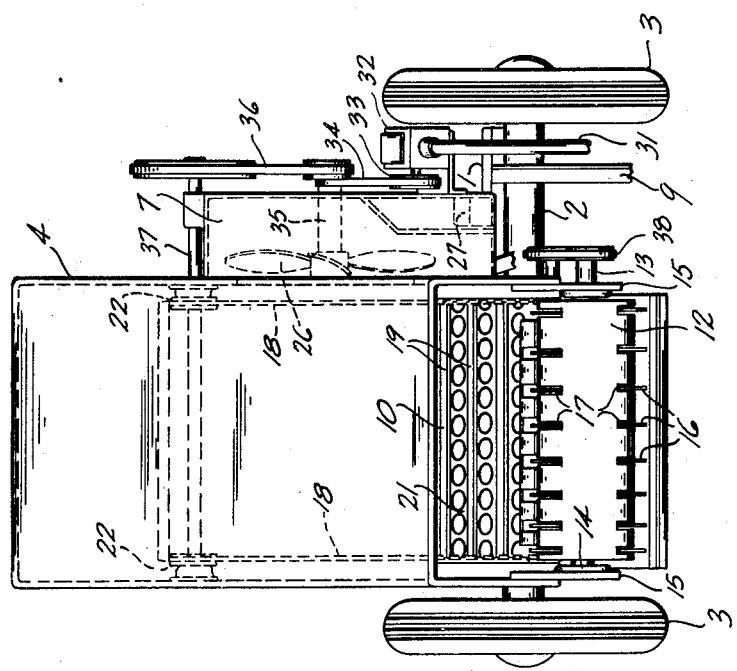
Inventor
Sherman C. Heth
By Elwin C. Andrus
Attorney Patented July 4, 1950

2,513,480

UNITED STATES PATENT OFFICE 2,513,480

MOBILE CROP DRIER

Sherman C. Heth, Racine, Wis., assignor to J. I. Case Company, Racine, Wis., a company of Wisconsin Application February 10, 1947, Serial No. 727,543

7 Claims. (Cl. 263—40)

This invention relates to a mobile crop drier of the type suitable for drying windrows of cut hay or grain to avoid the time required for sun drying after a rain or the like.

One of the objects of the invention is to provide a more efficient and rapid drier.

Another object of the invention is to provide a drier which does not excessively shake or disturb the hay or grain and which avoids loss of leaves or of the kernels of grain.

Another object is to provide a drier of more simple construction and which is less costly.

Another object is to provide a drier which may be regulated in speed to enable maximum efficiency in operation to be obtained at all times.

An embodiment of the invention is illustrated in the accompanying drawings in which:

Fig. 2 is a top plan view of the drier with parts broken away and sectioned;

Fig. 3 is a front elevation of the drier; and

Fig. 4 is a detail section showing the fan housing and burner chamber construction.

Figure 1:
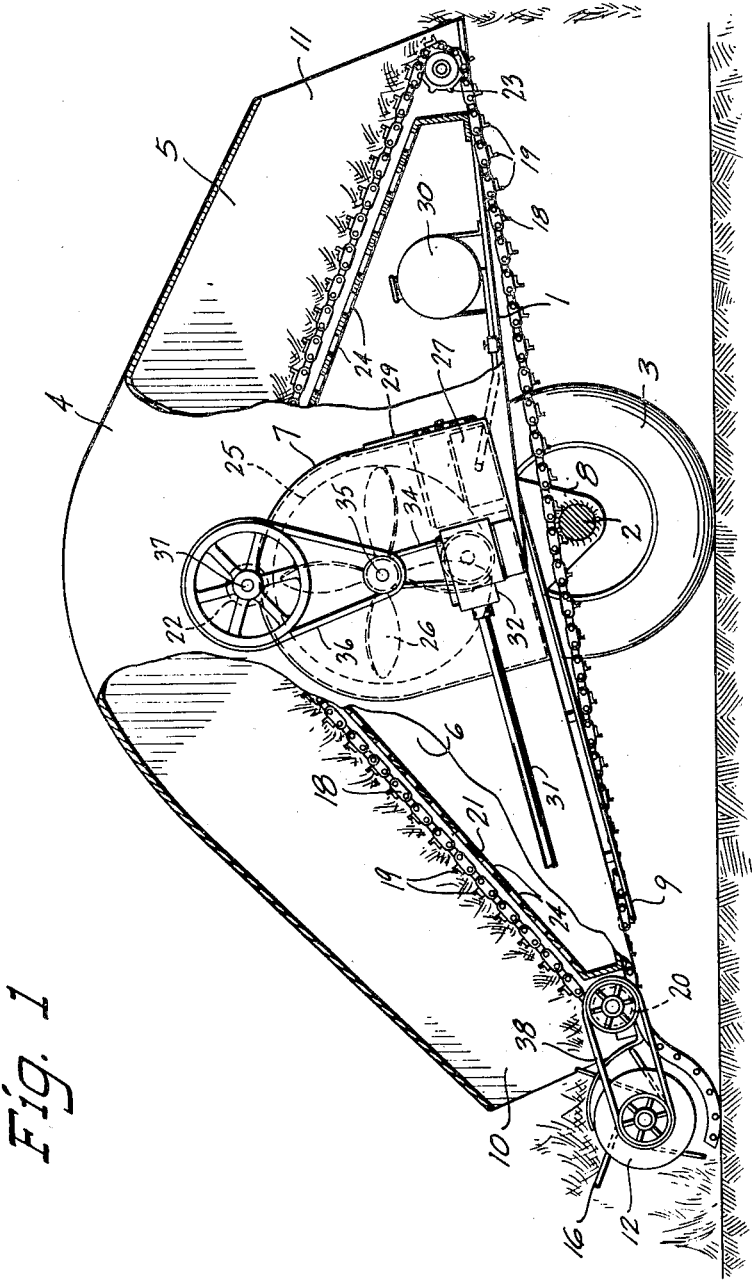
Figure 1 is a side elevation of a drier with parts of the housing broken away and sectioned.

The drier comprises, in general, a frame 1 mounted on an axle 2 disposed transversely of the center of the frame and supported by a pair of wheels 3, a housing 4 separated into an upper generally inverted V-shaped passage 5 for the crop and a lower heat distributing chamber 6, and a second housing 7 mounted on one side of housing 4 and providing a burner and fan chamber for supplying heated air to the drier.

The frame 1 is suitably constructed of side bars and cross bars extending horizontally for the full length and width, respectively, of the drier and which support the housings 4 and 6.

The axle 2 extends beneath the housing 4 and housing 6 and is secured to the frame 1 by suitable brackets 8 depending from the latter and to which the axle is welded, the wheels 3 being rotatably mounted on the axle.

A drawbar 9 is secured to the axle 2 and frame 1 beneath housing 6 and extends forwardly along one side of housing 4 for attachment to a tractor for pulling the drier in the field, the tractor being disposed to one side of the drier so that it need not travel on the windrow of hay or grain being dried.

The housing 4 is open at both ends to provide an intake opening 10 of adequate height to receive the incoming crop material at the forward end, and a discharge opening 11 at the rear end of the housing.

A pick-up roller 12 is mounted on the front end of frame 1 just ahead of the intake opening 10 and is adapted to rake the ground ahead of the drier and to pick up and deliver all cut crop material to the drier as the housing moves forwardly over the ground. The pick-up 12 may be of any suitable construction and may have a roller and rake mechanism of the type and construction illustrated in United States Patent No. 2,324,261 granted to N. R. Krause on July 13, 1943.

The pick-up 12 constitutes a large-diameter drum-like roller having a length equal to the width of the drier housing 4 and which is preferably somewhat in excess of the width of a windrow of crop material.

The pick-up roller is mounted at its ends on a shaft 13 rotatably supported in bearings 14 carried by side extensions 15 of frame 1. The roller carries a plurality of raking teeth 16 arranged in circumferentially spaced rows extending longitudinally of the roller.

The teeth 16 are spring mounted and extend outwardly through individual slots 17 in the roller to yieldably engage the ground and rake and lift the crop material. For this purpose the roller is power driven in a direction opposite to that of wheels 3 and in which the teeth move forwardly on the underside of the roller, in raking contact with the ground, and upwardly on the front side of the roller to lift the crop material over the roller and deposit the same in the opening 10.

The crop material is transferred through the housing 4 by means of an endless conveyor comprising side chain members 18 carrying a plurality of spaced angle iron transverse slats 19 having their opposite ends secured to the corresponding chains.

The chains 18 extend over corresponding idler sprockets 20 at the forward end of housing 4 behind pick-up 12, thence upwardly along the inclined partition 21 between passage 5 and heating chamber 6, over corresponding drive sprockets 22 disposed in openings in partition 21, down along the inclined partition 21 to the rear end of housing 4, over corresponding idler sprockets 23 and thence forwardly along frame 1 to the front sprockets 20.

The height of passage 5 above partition 21 should be sufficient to provide for the transfer of hay or the like through the passage without obstruction, the top of housing 4 serving to close the passage above the same.

The partition 21 constitutes the floor for passage 5 to confine the material being conducted through the passageway, and is of perforated sheet metal with holes 24 preferably distributed throughout the same to provide for the rise of heated air from chamber 6 upwardly into passage 5 and through the crop material. The heated air, after serving to dry the material passes outwardly through the open ends 10 and 11 of housing 4. The holes 24, if preferred, may be disposed only in the central peak of the partition 21, in which case it is important to have the crop material matted to substantially fill the passage 5.

The heating chamber 6 is closed on the sides by the sides of housing 4 and on the bottom by a removable bottom plate for housing 4, resting on frame 1. The partition 21 constitutes the top of chamber 6.

The chamber 6 serves as a distributor for heated air and may contain heating means for the air. In the embodiment shown, the air is heated in the burner housing 7 on the outside of housing 4 and is driven into the chamber 6 through a circular opening 25 in the side of housing 4 covered by housing 7.

A fan 26 is mounted in housing 7 adjacent opening 25 to force the heated air into chamber 6 and through partition 21 and the crop material.

The air may be heated by any suitable means, that shown being an oil burner 27 disposed in an opening 28 in the peripheral wall of housing 7. The opening 28 may have a slide cover 29 which may be adjusted to regulate the size of the opening to control the amount of cold air passing into the housing 7 in excess of that required for combustion at the burner 27.

A fuel tank 30, carried by frame 1, is preferably disposed either beneath or inside of chamber 6 and is connected to the burner 27 to supply the same with fuel.

The pick-up 12, conveyor 18—19 and fan 26 are preferably power driven by a power take-off from the tractor, although any one or all of them may be driven from one of the wheels 3.

In the embodiment shown, the power take-off shaft 31 extends rearwardly from the tractor, not shown, into a gear box 32 on the side of housing 7 where its rotary motion is transformed by suitable gearing to drive a belt pulley 33.

A belt 34 drives the shaft 35 of fan 26 from drive pulley 33. A second belt 36 drives the shaft 37 for sprockets 22 to drive the conveyor 18—19.

The pick-up 12 is driven by a belt or chain 38 from the shaft 39 for the front idler sprockets 20 of the conveyor 18—19.

The drier may be moved forwardly over the ground at a varying speed to compensate for differences in the quantity of crop material in the windrow and provide a steady uniform supply of material passing through the drier. In general, it will be desirable to have the conveyor 18—19 move at a substantially slower rate than the ground speed for the drier in order to assure a proper thickness of crop material on the partition 21 and effect an even distribution of the heated air throughout the material. Too thin a mat of hay or the like on partition 21 will allow free passage of air through openings 24 where there is no contact with the hay, and the heated air will be thus wasted.

The length of time required to satisfactorily dry any given crop material varies, and the period of its exposure to the heated air may be regulated by changing the forward speed of the tractor or by changing the speed of conveyor 18—19 within the limits allowable for maintaining the required mat of material in passage 5. The length of time required may be altered also by adjusting the burner 27 or the secondary air slide 29.

Various embodiments of the invention may be employed within the scope of the accompanying claims.

I claim:

1. A mobile drier for cut hay and the like, comprising a housing defining an open ended single course passageway for the crop material from the front to the rear of the housing and a distributing chamber for heated air beneath said passageway, a perforate partition between said passageway and said chamber and disposed to confine the material moving through said passageway, means disposed at the forward end of said housing to pick up crop material from the ground as the housing is moved forwardly thereover, means to move the crop material through said passageway and to discharge the same progressively upon the ground in a dried condition, means to heat air for passage through said partition and crop material, and means for forcing the heated air to distribute itself through said chamber and partition and to filter the same through the crop material towards at least one end of said passageway.

2. A mobile drier for cut hay and the like, comprising a housing defining an open ended single course passageway for the crop material from the front to the rear of the housing and a distributing chamber for heated air beneath said passageway, a perforate partition between said passageway and said chamber and disposed to confine the material moving through said passageway, means disposed at the forward end of said housing to pick up crop material from the ground as the housing is moved forwardly thereover, means to move the crop material through said passageway and to discharge the same progressively upon the ground in a dried condition, means to heat air for passage through said partition and crop material, and means for forcing the heated air to distribute itself through said chamber and partition and to filter the air through the crop material towards both ends of said passageway.

3. A mobile drier for cut hay and the like, comprising a housing defining an open ended single course passageway for the crop material from the front to the rear of the housing and a distributing chamber for heated air beneath said passageway, a perforate partition between said passageway and said chamber and constituting a stationary floor for said passageway, means disposed at the forward end of said housing to pick up crop material from the ground as the housing is moved forwardly thereover, means to move the crop material through said passageway and to discharge the same progressively upon the ground in a dried condition, and means to heat air and to supply the same to said distributing chamber under a flow pressure to effect distribution of the air through said partition throughout the same for filtering through the moving crop material to the ends of said passageway.

4. A mobile drier for cut hay and the like, comprising a housing defining an open ended single course passageway for the crop material from the front to the rear of the housing and a distributing chamber for heated air beneath said passageway, a perforate partition between said passageway and said chamber, means to move the crop material through said passageway and to discharge the same progressively upon the ground in a dried condition, means to heat air for passage through said partition and crop material, means for forcing the heated air to distribute itself through said chamber and partition and to filter the same through the crop material towards both ends of said passageway, and means at the forward end of said housing coordinated in speed to said last named means and disposed to pick up the crop material from the ground as the drier moves forwardly and deliver it to said passageway.

5. A mobile drier for cut hay and the like, comprising a housing defining an open ended single course passageway for the crop material from the front to the rear of the housing and a distributing chamber for heated air beneath said passageway, a perforate partition between said passageway and said chamber, means to move the crop material through said passageway and to discharge the same progressively upon the ground in a dried condition, means to heat air for passage through said partition and crop material, means for forcing the heated air to distribute itself through said chamber and partition and to filter the same through the crop material towards both ends of said passageway, means at the forward end of said housing to pick up the crop material from the ground as the drier moves forwardly and deliver it to said passageway, and means to drive said pick-up means and move said drier forwardly at a speed correlated to the speed of movement of the crop material through the passageway to provide a substantially uniform mat of material above said partition.

6. A mobile drier for cut hay and the like, comprising a frame supported on wheels for movement along windrows of crop material in a field, a drying channel on said frame for receiving and drying the crop material, means for picking up the crop material and delivering the same to the channel as the drier is moved along a windrow, means in said channel for moving the material longitudinally therethrough and discharging the same at the rear end of the drier at a linear speed substantially slower than the ground speed of the drier to provide a uniform mat of material in said channel, and means coordinated in speed with said last named means and disposed to force hot combustion gases upwardly through the crop material as the same moves through said channel.

7. A mobile dried for cut hay and the like, comprising a housing supported on wheels for movement along windrows of crop material in a field, a passageway for crop material through said housing from the front to the back thereof with the center of the passageway substantially higher than the ends, a perforate floor for said passageway providing openings through which heated gases may pass upwardly into the crop material, a chamber beneath said floor for distributing hot gases to perforations therein, a burner housing adjacent said chamber and containing a burner for supplying hot combustion gases thereto, a fan between said last named housing and said chamber for forcing the combustion gases into said chamber under sufficient flow pressure to effect filtering of the gases upwardly through the crop material from said perforate floor and longitudinally downwardly through said passageway to the ends thereof, an endless slat conveyor for moving the crop material through said passageway in contact with said floor, and a pick-up means at the front of said passageway for picking up crop material and delivering the same to said conveyor.

SHERMAN C. HETH.

REFERENCES CITED

The following references are of record in the file of this patent:

UNITED STATES PATENTS

| Number | Name | Date |
|---|---|---|
| 1,191,980 | Mason | July 25, 1916 |
| 1,255,982 | Byers | Feb. 12, 1918 |
| 1,749,451 | Strong | Mar. 4, 1930 |
| 2,347,664 | Chilton | May 2, 1944 |
| 2,390,375 | Kucera | Dec. 4, 1945 |
| 2,397,363 | McLeod | Mar. 26, 1946 |
| 2,442,344 | Curtis | June 1, 1948 |